United States Patent
Loget et al.

(10) Patent No.: US 10,745,821 B2
(45) Date of Patent: Aug. 18, 2020

(54) DISSYMETRIC PARTICLES (JANUS PARTICLES) AND THEIR METHOD OF SYNTHESIS BY BIPOLAR ELECTROCHEMISTRY

(71) Applicants: UNIVERSITE DE BORDEAUX, Bordeaux (FR); INSTITUT POLYTECHNIQUE DE BORDEAUX, Talence (FR); CENTRE NATIONAL DE LA RECHERCHE SCIENTIFIQUE, Paris (FR)

(72) Inventors: Gabriel Michel Pierre Loget, Irvine, CA (US); Alexander Kuhn, Guillac (FR)

(73) Assignees: UNIVERSITE DE BORDEAUX, Bordeaux (FR); INSTITUT POLYTECHNIQUE DE BORDEAUX, Talence (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 74 days.

(21) Appl. No.: 15/267,538

(22) Filed: Sep. 16, 2016

(65) Prior Publication Data

US 2017/0130356 A1 May 11, 2017

Related U.S. Application Data

(62) Division of application No. 13/996,783, filed as application No. PCT/FR2011/053001 on Dec. 15, 2011.

(30) Foreign Application Priority Data

Dec. 22, 2010 (FR) ...................................... 10 61031

(51) Int. Cl.
*C25D 13/12* (2006.01)
*B01J 13/04* (2006.01)
*C25D 5/02* (2006.01)

(52) U.S. Cl.
CPC .............. *C25D 13/12* (2013.01); *B01J 13/04* (2013.01); *C25D 5/02* (2013.01); *Y10T 428/2991* (2015.01)

(58) Field of Classification Search
CPC ....................................................... C25D 7/006
(Continued)

(56) References Cited

U.S. PATENT DOCUMENTS 3,984,295 A * 10/1976 Kametani ................. C25C 1/12
    205/575
4,699,700 A * 10/1987 Dhooge ................ C02F 1/4672
    204/291

(Continued)

FOREIGN PATENT DOCUMENTS

JP      2002-069689     3/2002
WO      WO 2009/074692 A2     6/2009

OTHER PUBLICATIONS

Jean-Claude Bradley et al:"Contactless electrodeposition of Palladium Catalysts" angewandte chemie international edition/vol. 38/No. 11/Jun. 1, 1999/pp. 1663-1666/55005342.

(Continued)

*Primary Examiner* — Brian W Cohen
(74) *Attorney, Agent, or Firm* — Patterson Thuente Pedersen, P.A.

(57) ABSTRACT

Dissymmetric particles also called Janus particles of micron or submicron size and methods of synthesis of Janus particles by bipolar electrochemistry, based on substrates of isotropic or anisotropic shape. The particles include an electrically conductive substrate having at least a chemically (Continued)

and/or physically modified part by deposit of a layer of electrochemically depositable material, and a non-modified part. The particles are of isotropic shape, and the layer of electrochemically depositable material has a specific shape delimited by a precise contour.

3 Claims, 6 Drawing Sheets

(58) Field of Classification Search
USPC .......................................................... 205/147
See application file for complete search history.

(56) References Cited

U.S. PATENT DOCUMENTS

| | | | | |
|---|---|---|---|---|
| 6,080,282 | A * | 6/2000 | Kolb .................. | H01B 1/122 204/157.6 |
| 6,214,210 | B1 * | 4/2001 | White .................. | B23K 31/12 205/790.5 |
| 6,346,182 | B1 * | 2/2002 | Bradley .................. | B01J 37/348 205/102 |
| 7,422,677 | B2 * | 9/2008 | Mazur .................. | B23H 5/08 205/662 |
| 8,906,218 | B2 * | 12/2014 | Kramer .................. | C25D 7/12 205/147 |
| 2006/0134420 | A1 | 6/2006 | Poncet-Legrand et al. | |
| 2007/0227903 | A1 * | 10/2007 | Turner .................. | B01D 61/44 205/705 |
| 2008/0213593 | A1 | 9/2008 | Bala Subramaniam et al. | |
| 2011/0284386 | A1 * | 11/2011 | Willey .................. | C25D 3/38 205/96 |
| 2014/0030527 | A1 | 1/2014 | Loget et al. | |

OTHER PUBLICATIONS

Adeline Perro et al:"Design and synhesis of Janus Micro/nanoparticles" journal of materials chemistry, the royal society of chemistry, cambridge, GB/vol. 15/Jun. 25, 2005/ pp. 3745-3760/ XP002489700.
Juan G. Duque et al:"self-assembled nanoparticle-Nanotubes structures (nanoPaNTs) based on Atenna Chemistry of single-walled carbon nanotubes" journal of physical chemistry C/vol. 113/No. 43/Oct. 29, 2009/pp. 18863-18869/ XP55005349.
Jean-Claude Bradley et al:"creating electical contacts between metal particules using directed electrochemical growth" Nature/vol. 389/No. 6648/Sep. 18, 1997/pp. 268-271/ XP55005350.
Chompunuch warakulwit et al:"dissymmectric carbon Nanotube by Bipolar electrochemistry" Nano Letters vol. 8/No. 2,1/Feb. 1, 2008/pp. 501-502/ XP55005352.
Loget g. et al:"Single point electrodeposition of Nickel for the dissymmetric decoration of carbon tubes" electrochimica Acta/ elsevier science publishers, Barking, GB/ vol. 55/No. 27/Nov. 30, 2010/pp. 8116-8120/ XP027428432.
De Gennes, P.G., "Soft Matter", Reviews of Modern Physics, vol. 64, No. 3, Jul. 1992, pp. 645-648.
Walther, Andreas et al., "Janus particles", Published Feb. 26, 2008, Downloaded by University of California—Irvine on May 11, 2013, pp. 663-668.
Cole-Hamilton, David J., "Janus Catalysts Direct Nanoparticle Reactivity", Science, downloaded from www.sciencemag.org on Nov. 5, 2013, 3 pages.
Hu, Shang-Hsiu et al., "Nanocomposites with Spatially Separated Functionalities for Combined Imaging and Magnetolytic Therapy", J.Am. Chem. Soc., vol. 132, No. 21, Mar. 25, 2010, pp. 7234-7237.
Roh, Kyung-Ho et al., "Biphasic Janus particles with nanoscale anisotropy", Nature Publishing Group, Sep. 25, 2005, pp. 259-263.
Paunov, Vesselin N. et al., "Supraparticles and "Janus" Particles Fabricated by Replication of Particle Monolayers at Liquid Surfaces Using a Gel Trapping Technique", Advanced Materials, May 17, 2004, pp. 788-791.
Reiche, Harald et al., "Heterogeneous Photocatalytic and Photosynthetic Deposition of Copper on TiO2 and WO3 Powders", The Journal of Physical Chemistry, vol. 83, No. 17, Feb. 5, 1979, pp. 2248-2251.
Mokari, Taleb et al., "Formation of asymmetric one-sided metal-tipped semiconductor nanocrystal dots and rods", Nature Publishing Group, Oct. 16, 2005, www.nature.come/naturematerials, pp. 855-863.
Fleischmann, Martin et al., "Electrochemical Behavior of Dispersions of Spherical Ultramicroelectrodes", The Journal of Physical Chemistry, vol. 90, No. 23, Jun. 3, 1986; pp. 6392-6400.
Chow, Kwok-Fan et al., "A Large-Scale, Wireless Electrochemical Bipolar Electrode Microarray", JACS Communication, May 28, 2009, pp. 8364-8365.
Ordeig, Olga et al., "On-Chip Electric Field Driven Electrochemical Detection Using a Poly(dimethylsiloxane) Microchannel with Gold Microband Electrodes", Analytical Chemistry, vol. 80, No. 10, May 15, 2008; pp. 3622-3632.
Ulrich, Christian et al., "Potential and Current Density Distributions at Electrodes Intended for Bipolar Patterning", Analytical Chemistry, vol. 81, No. 1, Jan. 1, 2009; pp. 453-459.
Bouchet, Aurelie et al., "Contactless Electrofunctionalization of a Single Pore", www.small-journal.com, Jul. 8, 2009, pp. 2297-2303.
Bradley, Jean-Claude et al., "Wire Formation on Circuit Boards Using Spatially Coupled Bipolar Electrochemistry", Advanced Materials, Aug. 13, 1997; pp. 1168-1171.
Loget, Gabriel et al., "Propulsion of Microobjects by Dynamic Bipolar Self-Regeneration", JACS Communications, Aug. 24, 2010, pp. 15918-15919.
Application and File history for U.S. Appl. No. 13/996,783, filed Oct. 15, 2013. Inventors: Loget et al.
Office Action dated Jan. 26, 2016 for Japanese Application No. 2013-545463, 5 pages.
Office Action dated Oct. 19, 2018 for EP Application No. 11817348. 3, 6 pages.
Office Action dated Oct. 24, 2018 for Canadian Application No. 2,822,779, 10 pages.

* cited by examiner

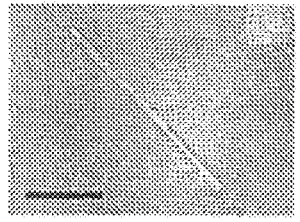 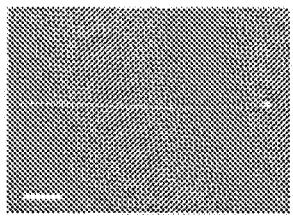 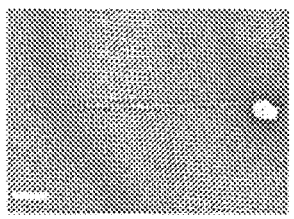 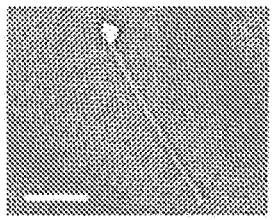
FIG. 6A     FIG. 6B     FIG. 6C     FIG. 6D
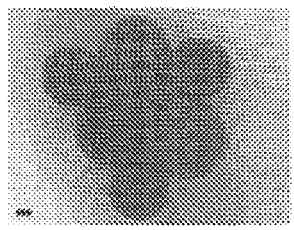 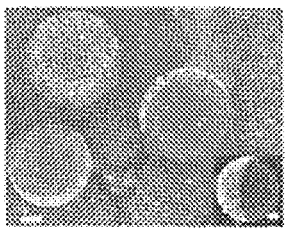 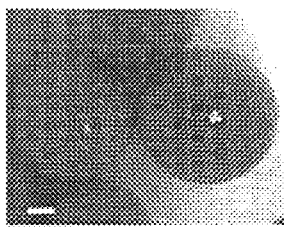 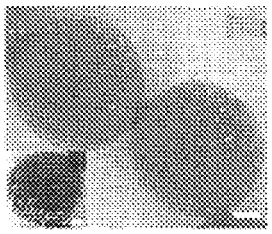
FIG. 6E     FIG. 6F     FIG. 6G     FIG. 6H
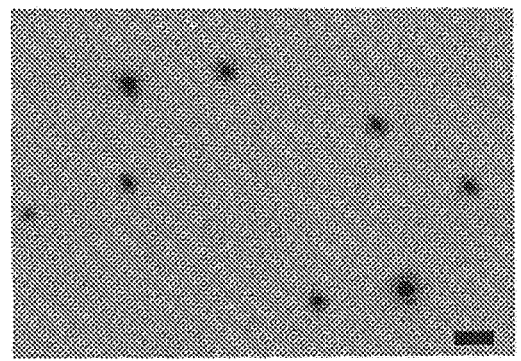 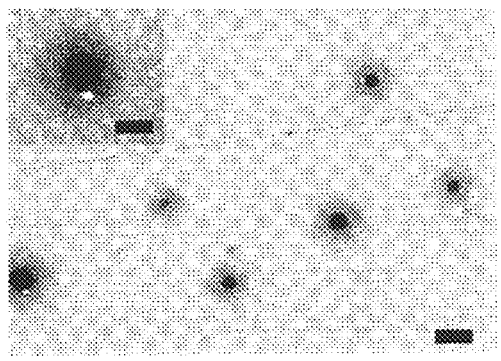
FIG. 7A     FIG. 7B

DISSYMETRIC PARTICLES (JANUS PARTICLES) AND THEIR METHOD OF SYNTHESIS BY BIPOLAR ELECTROCHEMISTRY

RELATED APPLICATIONS

This application is a divisional of application Ser. No. 13/996,783, filed Oct. 15, 2013, which is a National Phase entry of PCT Application No. PCT/FR2011/053001, filed Dec. 15, 2011, which claims priority from FR Patent Application No. 1061031, filed Dec. 22, 2010, each of which is hereby fully incorporated herein by reference.

FIELD OF THE INVENTION

The present invention generally relates to dissymmetric particles, also called Janus particles of micron or submicron size, as well as a method of synthesis of such particles by bipolar electrochemistry.

REFERENCES

In the description below, the references in exponent position refer to the list of references given after the examples.

BACKGROUND OF THE INVENTION

In Roman mythology, Janus is a god with a head but with two opposite faces. By analogy, the term "Janus" qualifies any dissymmetric object, such as a spherical particle whereof the two hemispheres would be physically and/or chemically different.

In embodiments of the present invention, by the term Janus particles, is meant dissymmetric particles of micron or submicron size having two parts that are chemically different and/or have different polarities[1,2]. Due to these properties, these particles constitute a unique category of materials that have a growing interest to both the industry and the scientific community. In fact, such particles can be used in a large number of applications ranging from catalysis[3] fields to therapeutic treatments[4]. Until now, most of the techniques and methods used to generate such objects required to break the symmetry by introducing an interface[2,5,6,7]. However, this has the disadvantage of making the preparation of large quantities of particles rather difficult in as far as most techniques usually lead to equivalents of a monolayer of materials, since the particle modifications take place in a two-dimensional reaction space.

As a consequence, there is thus an increasing need in the development of alternative techniques and methods for replacing the two-dimensional approaches with real three-dimensional techniques, which allow for an extrapolation (in the sense of a change of scale) of a small scale production of Janus particles (typically at a laboratory scale) towards a large-scale production of industrial type.

Currently, there are only three really specific three-dimensional methods, but which do not allow a fine adjusting of the drive force of the modification[8,9,10]. For example, one possible approach is based on the generation of charge carriers on semiconductors using light[8] or antenna[9] effects. Another interesting method is that described by Banin et al[10] which consists in using the $HAuCl_4$ compound to make a material grow on gold tubes or on cadmium selenide nanotubes.

Within this context, bipolar electrochemistry represents another attractive possibility of selectively modifying particles in a three-dimensional reaction medium. This concept, which was first described by Fleischmann et al[11] in 1986, is based on the fact that when placing a conductive object in an electric field of high intensity between two electrodes, a polarization which is proportional to the electric field as well as to the characteristic dimensions of the object, appears. If the polarization is strong enough, the oxidation-reduction reactions can occur at the opposite ends of the object.

There are recent applications of this concept as a drive force in the electrochemiluminescence reactions[12] as detection modes in capillary electrophoresis[13], for the preparation of structured surfaces[14], for the functionalization of membrane pores[15], for the creation of electrical contacts[16] and as a mechanism for moving micro-objects[17].

The potential value V created between the two ends of a conductive substrate placed in an electric field is given by the equation (1) herebelow:

$$V = Ed \qquad (1)$$

with E defining the overall electric field and d defining the size of the particle.

It results that when an electric field of appropriate intensity is used, the drive force which constitutes the potential difference V can be used to carry out oxidation reduction reactions at the two ends of the substrate, thus leading to dissymmetrization of the particles as is illustrated on FIG. 1 attached to the present application. On this figure, "+" indicates the oxidation site and "−" the reduction site.

In order to achieve the two oxidation-reduction reactions at the opposite sides of an object, the potential difference V must be in first approximation at least equal to the difference between the formal potentials of the two oxidation-reduction pairs involved. For example, if one wishes to carry out dissymmetric functionalization with gold at the negatively charged ends by means of tetrachloroaurate, the following reaction must be carried out:

$$[Au^{III}Cl_4]^- + 3e^- \rightarrow Au^0_{(s)} + 4Cl^- \quad E^0 = 0.99 \text{ V vs NHE} \qquad (2)$$

with NHE being the normal hydrogen electrode serving as reference.

In order to be able to balance the consumption of fillers, an oxidation reaction must take place at the opposite end assuming that it is consists in the oxidation of water:

$$2H_2O_{(l)} \rightarrow 4H^+_{(l)} + O_{2(g)} + 4e^- \quad E^0 = 1.23 \text{ V vs NHE} \qquad (3)$$

It immediately ensues that, in this case, a minimal potential difference of approximately:

$$\Delta V_{min} = \frac{E^0_{Au}}{AuCl_4^-} - \frac{E^0_{H_2O}}{O_2} = 0.24 \text{ V} \qquad (4)$$

is required to trigger the reaction.

This becomes a problem inherent to this approach when the objects to be functionalized are of micro- or nanometric size, since E must then reach values of the order of MV m$^{-1}$. This is not compatible with a conventional industrial environment, and particularly when using aqueous solutions, due to intrinsic parasitic reactions, which are accompanied by the formation of macroscopic gas bubbles at each electrode, such that it disrupts the orientation of objects in the electric field.

This problem was partly resolved by Bradley et al. using organic solvents, such as to enlarge the potential window of the electrolyte, and thereby making it possible to generate metal deposits dissymmetrically on different objects of micron or submicron size[18, 19]. However, the technique used by Bradley et al. has the disadvantage of requiring the need to immobilize the objects on a surface such as to prevent them from rotating, meaning that the technique developed by Bradley et al. is in fact still a two-dimensional method and not a real three dimensional method taking place in the entire volume of the reactor.

It has recently been demonstrated that it was possible to overcome these drawbacks by a method of capillary electrophoresis implemented such as to be able to apply a high electric field[20,21]. However, considering that the modification of the particles is carried out in a capillary whereof the internal diameter cannot exceed a few hundred microns, the production of Janus particles is very slow, making this method unprofitable for industrial application.

SUMMARY OF THE INVENTION

Hence, a purpose of embodiments of the present invention is to overcome all or part of the disadvantages of the prior art, by implementing a truly three-dimensional method exhibiting a high flexibility of use, which makes the formation of a broad range of Janus particles possible in terms of material, size, shape and nature of the modification. Thus, the method developed by the applicants allows for the formation of Janus particles of micron or submicron size exhibiting an isotropic or anisotropic shape and whereof the modified part has a specific shape delimited by a precise outline.

Particularly, embodiments of the present invention relate to Janus particles of micron or submicron size comprising an electrically conductive substrate exhibiting an at least chemically and/or physically modified part by deposit of a layer of electrochemically depositable material and an unmodified part.

According to embodiments of the invention, these Janus particles are of isotropic shape, and the layer of electrochemically depositable material has a specific shape delimited by a precise contour.

By specific shape delimited by a precise contour is meant according to embodiments of the present invention, a predefined shape with precise contours, which is not a coincidence but a choice motivated by the concerned application.

By way of shape delimited by a precise contour, it may be particularly mentioned a circular line, point, or hemisphere or part of a hemisphere, as is shown in the example 5.

Janus particles may have one or several chemically and/or physically modified parts.

Thus, according to a particular embodiment of the present invention, the Janus particles have two chemically and/or physically modified parts, which can be identical or different.

For example, a particularly interesting configuration of the particles according to an embodiment of the invention can for example be the following: one of the parts is covered with a layer of a first electrochemically depositable material, and the other part is covered with a layer of a second electrochemically depositable material different from said first material. For such a configuration (two areas modified by covering with different materials), several alternatives are possible depending on the required application:

1. the first and second materials are electrically conductive materials;
2. the first and second materials are insulating materials;
3. the first material is an electrically conductive material and the second material is an insulating material.

By way of electrically conductive materials that can be used within the framework of embodiments of the present invention, it can be particularly cited metals and semiconductors.

Among the metals that can be used within the framework of embodiments of the present invention it can more particularly be cited gold, copper, zinc, silver, platinum and nickel.

Among the semiconductors that can be used within the framework of embodiments of the present invention, it can be more particularly cited ZnO, CdS, CdSe and $TiO_2$.

By way of an insulating material that can be used within the framework of embodiments of the present invention, it may be particularly cited polymeric materials, organic molecules (particularly electrophoretic paint), silica-based sol-gel materials, metal oxides or metal salts.

Among the polymeric material that can be used within the framework of embodiments of the present invention, one may particularly cite the polymers selected from the families of polypyrroles, polyanilines and polythiophenes.

The substrate of the Janus particles must necessarily be an electrically conductive substrate so that the polarization can take place when the substrate is placed in the electric field between two electrodes according to a method of the invention.

It may consist of a substrate in a conductive or semi-conductive material, for example beads of carbon or of a metal or a metal alloy.

Embodiments of the present invention also relate to an electrochemical method for the synthesis of Janus particles based on electrically conductive submicron or micron substrates, wherein it comprises the following steps:

A. said substrates and at least one source of an electrochemically depositable material are introduced into an electrolytic solution contained in an electrodeposition cell defined by two separators, said cell being arranged between two electrodes;
B. a potential difference E is applied between the two electrodes such as to create a sufficiently strong electric field E and during a sufficiently long period in order to form Janus particles.

The method according to embodiments of the invention is applicable to particulate substrates of isotropic shape (in particular beads), as well as to substrates of anisotropic shape (for example, nanotubes or disks).

Particularly, the substrates are carbon or metal beads or nanotubes.

In order to achieve, using the method according to embodiments of the invention, Janus particles having two modified parts, one proceeds as follows:

1. in the case where there are two materials of different nature, a material is generated by reduction on one side (for example reduction of a metal cation), and the other material by oxidation on the other side (for example pyrrole oxidation) simultaneously;
2. in the case where there are two identical materials, voltage pulses can be imposed to allow the particles to rotate during the method. It can also proceed with a polarity reversal of the electrodes, which makes it possible to switch the anodic and cathodic poles of the substrates during the method.

According to a first particular embodiment of the method according to the invention (embodiment A), the separators are not permeable to the substrates and are placed in a same reactor of electrodeposition containing the electrolytic solution and the electrodes, by being arranged between said electrodes such as to define:

1. the electrodeposition cell wherein the substrates and the source(s) of electrically conductive material are put in solution;
2. a cathodic compartment, incorporating the electrode serving as cathode and adjacent to one of said separators; and
3. an anodic compartment, incorporating the electrode serving as anode and adjacent to the other separator.

In this embodiment, the separators, while being non-permeable to substrates are still permeable to ions. For example, it can consist in membranes that are non-permeable to substrates as well to the source of electrodepositable material, or it can also consist in frit materials, which are impermeable to substrates, but let the material source through.

In this embodiment, the electric field intensity will be of the order of 1 Kv/m to 1 MV/m, and its duration of application ranging between 10 seconds and 10 minutes, either continuously or intermittently and/or in an alternating manner.

According to a second embodiment of the method according to the invention (embodiment B), the separators are in a sealing material. For example, it may consist in thin glass walls or in plastic material such as PLEXIGLAS®. In this embodiment, the intensity of the electric field will be of the order of 1 Kv/m to 1000 MV/m, and its application duration ranging between 10 seconds and several hours.

As regards the source of electrochemically depositable material which is introduced into the cell, the latter can be selected from metal ions, metal salts (which form during the implementation of the method according to embodiments of the invention, first a hydroxide precipitating on the surface of the substrate to then be transformed into an oxide), the electro-polymerizable monomers, the organic electro-crystallizable salts, inorganic electro-crystallizable salts, organic electro-graftable molecules, electrophoretic paints and precursors of silica-based sol-gel materials.

By way of electro-polymerizable monomers, it may be particularly cited monomers derived from pyrrole, aniline and thiophene.

By way of precursors of silica-based sol-gel materials, it can also be cited precursors of alkoxysilane type which are selected from methyl trimethoxysilane (MTMS), tetraethoxysilane (TEOS), methyltriethoxylsilane (MTES) dimethyldiethoxysilane, and combinations thereof.

By way of metal ions, it can be particularly cited metal ions of gold, copper, zinc, silver, platinum and nickel.

Particularly, the shape of the layer of electrochemically depositable material is defined by acting on the concentration of the precursor filler and the electrodepositable material as well as on the applied electric field, as the shape of the layer depends on the competition between the direction of migration of the ions and the kinetics of electrodeposition, which substantially depends on the concentration of the precursor and the field applied.

The electrolytic solution implemented in the method according to the invention may be an aqueous solution or a non-aqueous solvent solution, for example toluene, acetonitrile, or combinations thereof.

If Janus particles of isotropic shape are realized using the method according to embodiments of the invention, it is important that the electrolytic solution has a viscosity that is sufficient to prevent or inhibit the particle from rotating. In a particular embodiment, the electrolyte solution is gelled.

When the substrates are of anisotropic shape, it is not necessary to increase the viscosity, but the viscosity can be increased to ensure that the deposit has a specific shape.

Finally, embodiments of the present invention also relate to a device for implementing the method according to embodiments of the invention, wherein the device comprises an electrodeposition cell containing the electrolytic solution, said cell being bounded by separators into a sealed material outside which electrodes are arranged in a contiguous manner.

BRIEF DESCRIPTION OF THE DRAWINGS

Other advantages and features of the present invention will become apparent from the following description given by way of non-limiting example and made with reference to the accompanying drawings:

FIG. 6A is a scanning electron microscopy (SEM) image of substrates of micron size and of anisotropic shape prior to bipolar electrodeposition;

FIGS. 6B to 6D are scanning electron microscopy (SEM) image of substrates of micron size and of anisotropic shape after bipolar electrodeposition;

FIG. 6E is a scanning electron microscopy (SEM) image of a second set of substrates of micron size and of isotropic shape prior to bipolar electrodeposition;

FIGS. 6F to 6H are scanning electron microscopy (SEM) image of the second set of substrates of micron size and of anisotropic shape after bipolar electrodeposition;

FIG. 7A is a scanning electron microscopy (SEM) image of substrates of submicron size and of isotropic shape prior to bipolar electrodeposition;

FIG. 7B is a scanning electron microscopy (SEM) image of substrates of submicron size and of isotropic shape after bipolar electrodeposition, the modified part corresponding to the small white dot;

DETAILED DESCRIPTION

Figure 1:
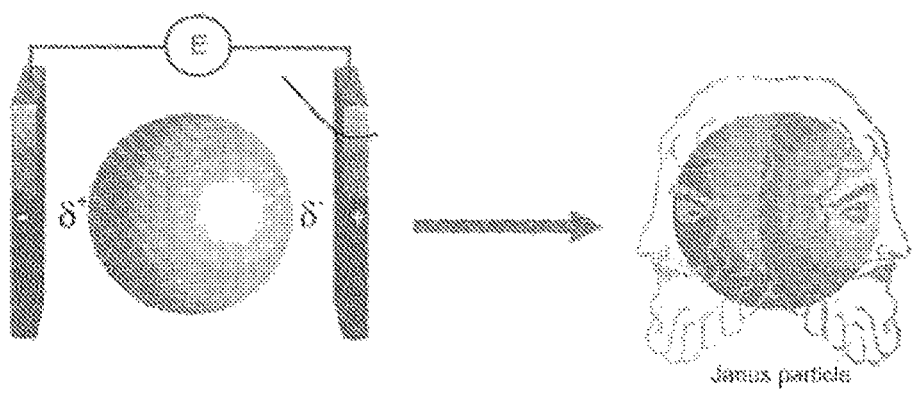
FIG. 1 represents a block diagram of the bipolar electrodeposition used to form Janus particles.

FIG. 1, which is discussed in the description of the prior art, represents a block diagram of an example of a device for implementing the method according to a first embodiment of the invention. This figure particularly shows that sufficient polarization of a conductive particle makes it possible to break the symmetry.

Figure 2:
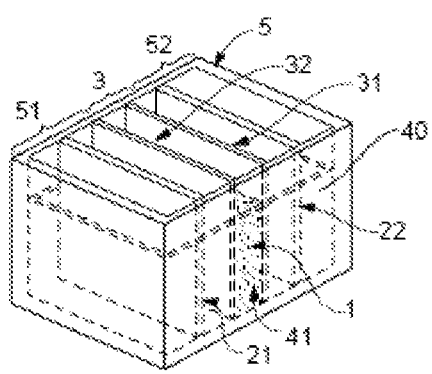
FIG. 2 represents a block diagram of an example of electrodeposition cell for implementing the method according to a first embodiment.
Figure 3:
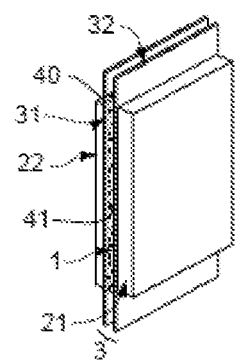
FIG. 3 represents a block diagram of an electrodeposition device for implementing the method according to a second embodiment.
Figure 4:
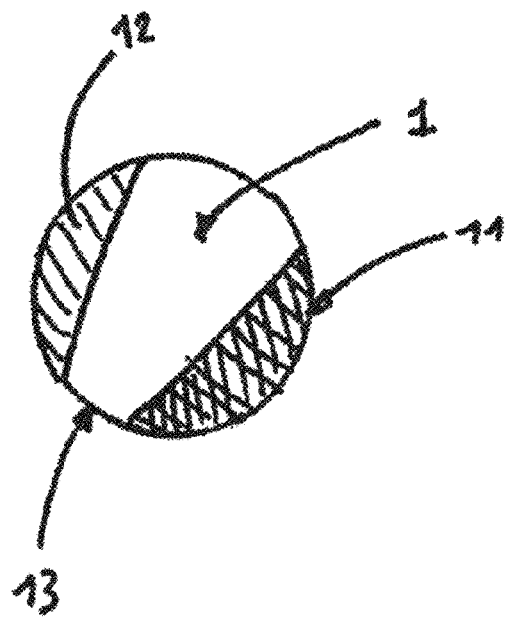
FIG. 4 schematically represents a Janus particle 1 according to an embodiment of the invention, of isotropic shape (in this instance a bead 13), which has two modified areas 11, 12.
Figures 5A, 5B, 5C:
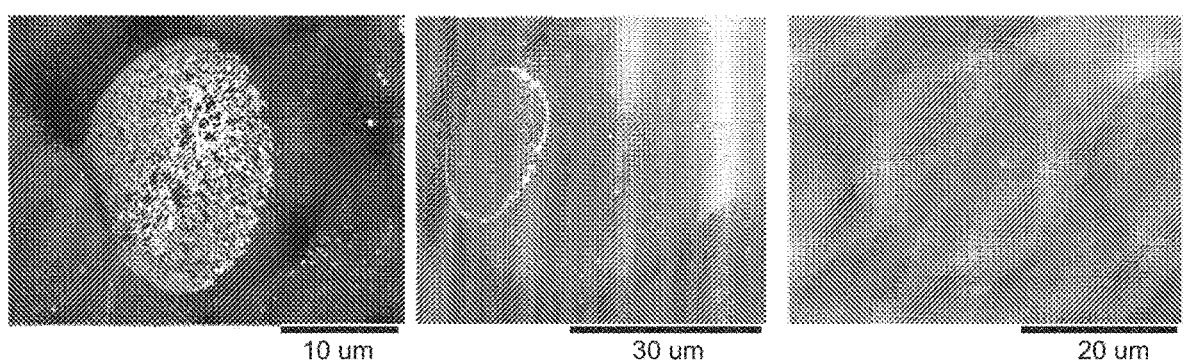
FIGS. 5A to 5C are scanning electron microscopy (SEM) images of three examples of Janus particles (carbon beads) according to embodiments of the invention of isotropic shape.

FIGS. 2 and 3 represent block diagrams of an electrodeposition device for implementing the method according to embodiments of the invention, each corresponding to a different embodiment. These figures show that the electrodeposition device comprises an electrodeposition cell 3, defined by two separators 31, 32, and is arranged between two electrodes 21, 22.

The operating principle for the two embodiments of the electrodeposition device, which is the same one, comprises the following steps:

A. micron or submicron substrates 1 are introduced and at least one source 41 of an electrochemically material depositable in an electrolytic solution 40 contained in the cell 3;

B. a potential difference E is applied between the two electrodes 21, 22 such as to create a sufficiently strong electric field E and during a sufficiently long period for forming Janus particles.

FIG. 2 more particularly represents an electrodeposition device 3, which comprises an electrodeposition reactor 5 containing the electrolytic solution 40, the electrodes 21 and 22 which are immersed into the electrolytic solution, and the separators 31, 32 which consist of membranes or plates which are non-permeable to the substrates. These membranes 31, 32 are arranged between the electrodes 21, 22 such as to define:

the electrodeposition cell 3 itself, wherein the substrates 1 of an electrically conductive material and the source 41 are introduced in order to put them in solution, a cathodic compartment 51, which includes the electrode serving as cathode 21 and is adjacent to one of the membranes 31, and an anodic compartment 52, which includes the electrode serving as anode 22 and is adjacent to the other membrane 32.

FIG. 3 more particularly represents an electrodeposition device 3 wherein the separators 31, 32 are membranes formed of a glass or polymer materials, such as, for example, sintered or fritted glass or PLEXIGLAS®. They delimit the electrodeposition cell 3 containing the electrolytic solution 40 and outside which 3 the electrodes 21, 22 are contiguously arranged.

The following examples illustrate the invention without however limiting its scope.

Example 1

Synthesis of Micron Janus Particles According to an Embodiment of the Invention, Monofunctionnalized Using the Device Represented in FIG. 2

Monofunctionnalized Janus particles were synthesized in accordance with the method according to an embodiment of the invention by using the electrodeposition device represented on FIG. 2 wherein:

a potential difference E of the order of 2 kV is imposed between the electrodes, resulting in an electric field E of 100 kVm$^{-1}$ in the electrodeposition cell, the separators are proton exchange membranes or sintered glass plates, and the electrodes 21, 22 are immersed in ethanol at −100° C. (to compensate for the effects of ohmic heating in the reactor) and at a distance of the order of 2 cm from each other.

The substrates 1 used are either carbon tubes (images 6A, 6B, and 6C) or vitreous carbon beads (images 6E, 6F, and 6G), the electrolytic solutions 40 are aqueous solutions which, as a source of electrodepositable material, contain the following metal salts:

$AuCl_4^-$ at 1 mM (images 6B and 6F), or $PtCl_6^{2-}$ at 10 mM (image 6C), or

Silver nitrate $AgNO_3$ 1 mM (image 6G).

In the particular case of the use of substrates of vitreous carbon beads, the electrolytic solution 40 is a hydrogel agar.

It was observed by scanning electron microscopy (SEM) the substrates before (images 6A and 6E) and after synthesis by electrodeposition (images 6B, 6C, 6F, 6G). On FIGS. 6A to 6C and 6E to 6G, the visible scale (white line) is of 5 mm. The results of these observations are summarized in table 1 below.

Example 2

Synthesis of Micron Janus Particles According to an Embodiment of the Invention, Monofunctionnalized Using the Device Represented on FIG. 3

Monofunctionnalized Janus particles were synthesized in accordance with the method according to an embodiment of the invention by using the electrodeposition device represented on FIG. 3 wherein:

a potential difference E of the order of 6 kV is imposed between the electrodes, resulting in an electric field E of 20 MV m$^{-1}$ in the electrodeposition cell, the separators are thin glass walls of 100 mm and separated from each other also by 100 mm;

the substrates 1 used are either 1 carbon tubes (images 6A1 and 6A4) or vitreous carbon beads (images 6E and 6H), the electrolytic solution 40 is a hydrogel of agar, which contains, as a source of electrodepositable material, the gold chloride $AuCl_4^-$ at 10 mM (image 6D) and gold chloride $AuCl_4^-$ at 1 mM (image 6H).

It was observed by scanning electron microscopy (SEM) the substrates before (images 6A and 6E) and after the synthesis by electrodeposition (images 6D and 6H). On FIGS. 6D and 6H, the visible scale (white line) is also of 5 mm. Results of these observations are summarized in table 1 below.

TABLE 1

| FIGS. | Substrate | Device Embodiment | Shape of deposit |
|---|---|---|---|
| 6A | C tubes | — | — |
| 6B | C tubes | A (FIG. 2) | point |
| 6C | C tubes | A (FIG. 2) | cluster |
| 6D | C tubes | B (FIG. 3) | cluster |
| 6E | Vitreous C beads | — | — |
| 6F | Vitreous C beads | A (FIG. 2) | Hemisphere dense deposit |
| 6G | Vitreous C beads | A (FIG. 2) | point |
| 6H | Vitreous C beads | B (FIG. 3) | Hemisphere non dense deposit |

Example 3

Synthesis of Submicron Janus Particles According to Embodiments of the Invention, Monofunctionnalized by Using the Device Represented on FIG. 2

Monofunctionnalized Janus particles were synthesized in accordance with the method according to an embodiment of the invention by using the electrodeposition device represented on FIG. 2 wherein:
  a potential difference E of the order of 2 kV is imposed between the electrodes, resulting in an electric field of 100 kV m$^{-1}$ in the electrodeposition cell;
  the separators are proton exchange membranes or sintered glass plates;
  the electrodes 21, 22 are immersed in ethanol at −100° C. (to compensate for the effects of ohmic heating in the reactor) and at a distance of the order of 2 cm from each other;
  the substrates 1 used are vitreous carbon beads; and
  the electrolytic solution 40 is a hydrogel of agar, which contains, as a source of electrodepositable material, gold chloride AuCl$_4^-$ at 10 mM.

It was observed by scanning electron microscopy (SEM) the substrates before (FIG. 7A) and after the synthesis by electrodeposition (FIG. 7B). On FIGS. 7A and 7B, the visible scale (black line) is of 1 mm.

Example 4

Synthesis of Micron Janus Particles According to Embodiments of the Invention, Copper/Polypyrrole Bi-Functionalized by Using the Device Represented on FIG. 2

Bi-functionalized copper/polypyrrole Janus particles were synthesized in accordance with the method according to an embodiment of the invention by using the electrodeposition device represented on FIG. 2 wherein:
  a first electrolytic solution 40 consisting of a suspension of Cu$^I$ in acetonitrile at the rate of 10 mM of Cu$^I$ is prepared, wherein carbon nanotubes are introduced at the rate of 0.1 mg into the suspension;
  a second electrolytic solution 40 is prepared comprising 10 mM of Cu$^I$ and 50 mM of pyrrole,
  a sonication of these two solutions is carried out during one minute,
  these two suspensions 40 are introduced into the electrodeposition cell 3;
  a potential difference of the order of 2 kV is imposed between the electrodes;
  the separators are proton exchange membranes; and
  the formation of a copper deposit is generated on one of the ends of the tubes by reduction of cation Cu$^+$, and the formation of a deposit of pyrrole is generated on the other side by oxidation of the pyrrole.

Figure 9A:
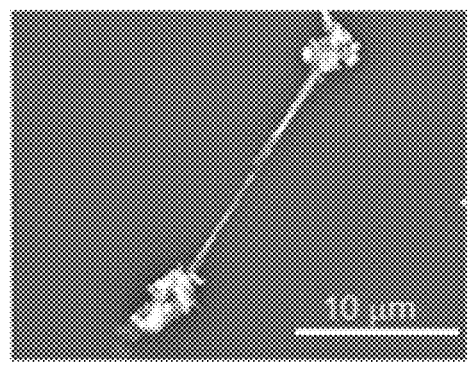
FIG. 9A is a scanning electron microscopy (SEM) image of a bi-functionalized copper/copper carbon tube by means of the process according to an embodiment of the invention.
Figure 9B:
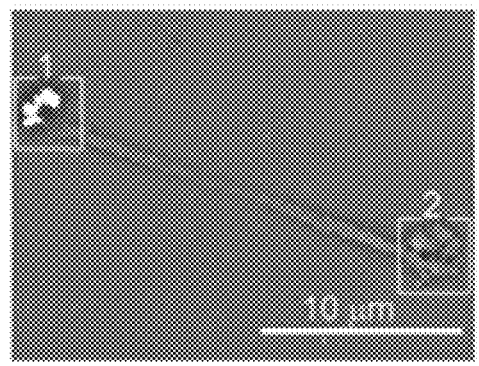
FIG. 9B is a scanning electron microscopy (SEM) image of a bi-functionalized copper/polypyrrole carbon tube by means of the method according to the invention.
Figure 9C:
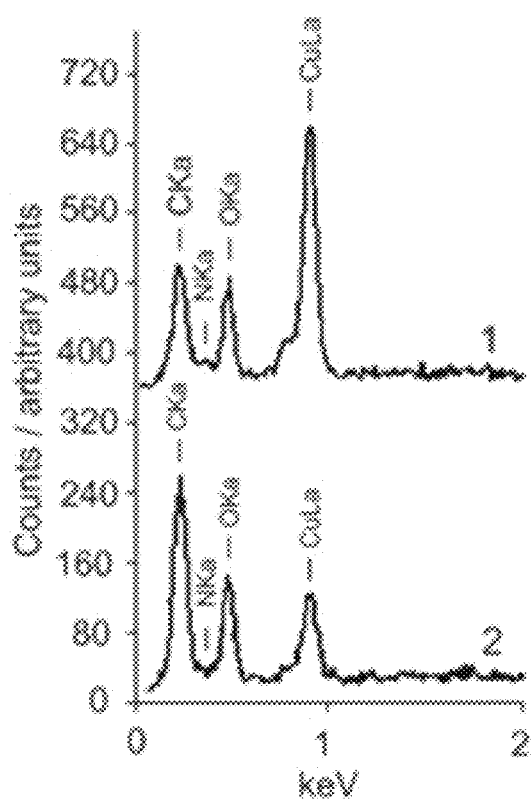
FIG. 9C is a spectrometric analysis of a bi-functionalized copper/copper carbon tube by means of the process according to an embodiment of the invention.

The thus obtained dissymmetrical copper/polypyrrole carbon tubes were observed by scanning electron microscopy (SEM): FIG. 9B, the visible scale (white line) is of 10 µm. The deposits were characterized by energy dispersive analysis (EDS) (FIG. 9C).

Example 5

Synthesis of Micron Janus Particles According to the Invention Copper/Copper Bi-Functionalized Using the Device Shown on FIG. 2

Bi-functionalized Janus particles were synthesized in accordance with the method according to an embodiment of the invention by using the electrodeposition device represented on FIG. 2 wherein:
  an electrolytic solution 40 consisting of a suspension of Cu$^I$ in acetonitrile at the rate of 10 mM of Cu$^I$ is prepared, wherein carbon nanotubes are introduced at the rate of 0.1 mg into the suspension;
  then a sonication of this solution is carried out during one minute,
  it is introduced into the electrodeposition cell 3;
  a potential difference is imposed in pulsed regime with an electric field of 125 MV m$^{-1}$ the electrodeposition cell: according to the tested pulses varying between 12 seconds and 30 seconds, variations are observed at the deposits, with a time interval between the pulses (relaxation time) of 1 second or 5 minutes;
  the separators are proton exchange membranes; and
  the formation of a copper deposit is generated on each of the ends of the tubes.

Figure 8A:
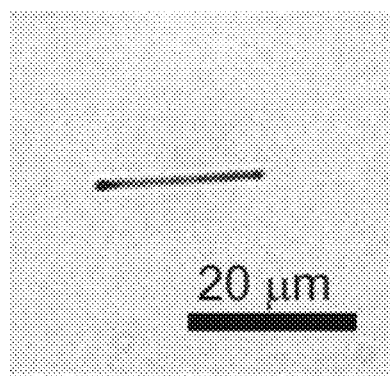
FIGS. 8A to 8D are images of optical microscopy in transmission of bi-functionalized copper/copper carbon tubes, by means of the method according to an embodiment of the invention by imposing voltage pulses.

The thus obtained modified bi-functionalized copper/copper carbon nanotubes were observed by optical transmission microscopy: on FIGS. 8A to 8D, the visible scale (black lines) is of 20 µm. FIGS. 8A (with a pulse interval of 5 minutes) and 8B (with a pulse interval of 10 s) correspond to a pulse of 12 seconds, whereas FIGS. 8C (with a pulse interval of 5 minutes) and 8D (with a pulse interval of 10 seconds) correspond to a pulse of 30 seconds. The obtained particles were also observed with a scanning electron microscope (SEM) (FIGS. 9A and 9B), with a spectrometric analysis of the obtained particles being represented in FIG. 9C.

Figure 8B:
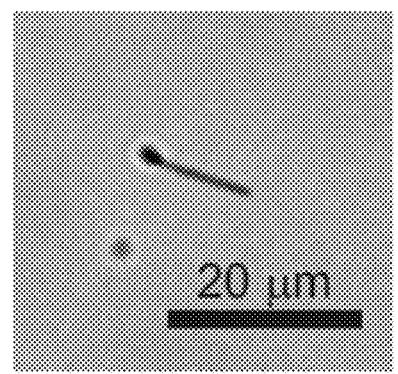
Figure 8C:
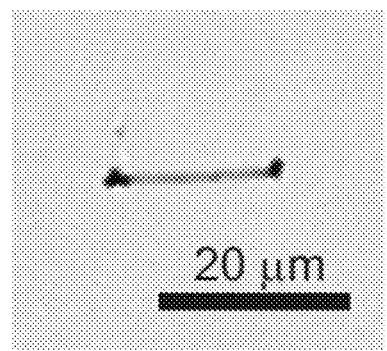
Figure 8D:
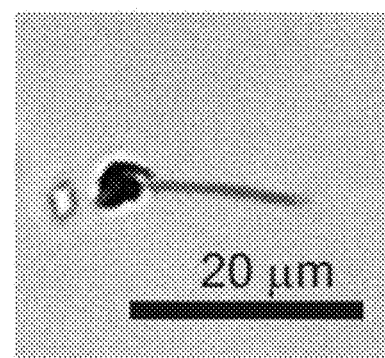

When the relaxation time (time between pulse potentials where the potential is stopped) is sufficiently long, symmetrically modified tubes (FIGS. 8A and 8C) are obtained, whereas when this time is short, the particles are only modified at one end (FIGS. 8B and 8D). The imposition time of the electric field also makes it possible to control the size of the deposit.

Figure 8E:
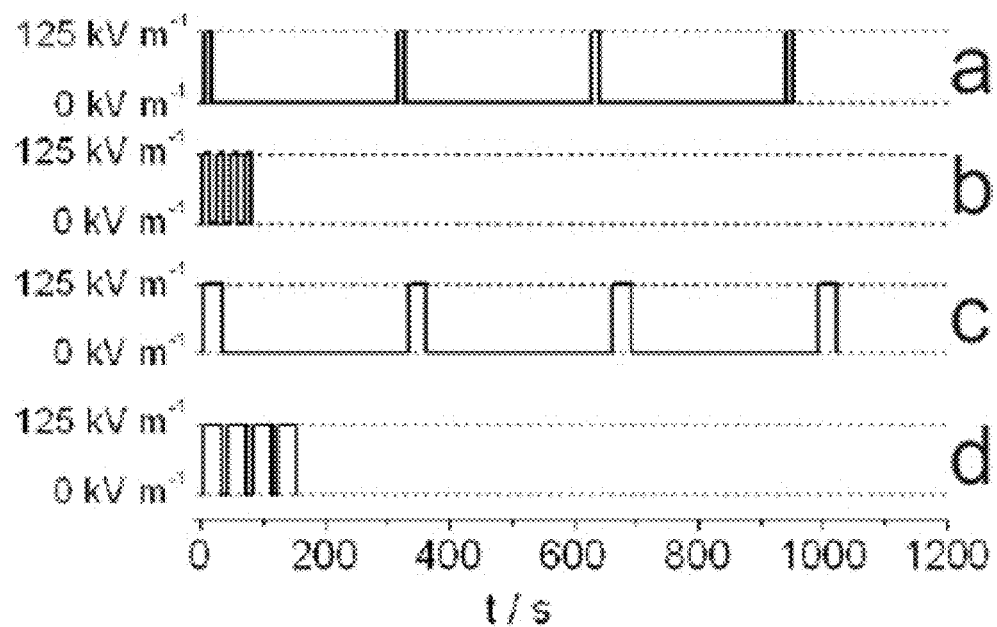
FIG. 8E is a set of voltage pulse waveforms that were used to create the results that are depicted in FIGS. 8A to 8D. The traces labeled "a" through "d" correlate with the images in FIGS. 8A to 8D, respectively.

FIG. 8E is a set of voltage pulse waveforms that were used to create the results that are depicted in FIGS. 8A to 8D. The traces labeled "a" through "d" correlate with the images in FIGS. 8A to 8D, respectively.

Example 6

Synthesis of Micron Janus Particles According to Embodiments of the Invention, Monofunctionnalized, Using the Device Represented on FIG. 2

Monofunctionnalized Janus particles were synthesized in accordance with the method according to an embodiment of the invention by using the electrodeposition device represented on FIG. 2 wherein:

a potential difference E of the order of 1 kV is imposed between the electrodes, resulting in an electric field of 25 kV m$^{-1}$ in the electrodeposition cell;

the separators are sintered glass plates;

the electrodes 21, 22 are immersed in ethanol at −100° C. (to compensate for the effects of ohmic heating in the reactor) and at a distance of the order of 4 cm from each other;

the substrates 1 used are vitreous carbon beads; and the electrolytic solution 40 is a hydrogel of ethylcellulose in ethanol, which contains, as a source of electrodepositable material, platinum chloride in the form of acid $H_2PtCl_6^{2-}$ at 5 mM.

Figure 10:
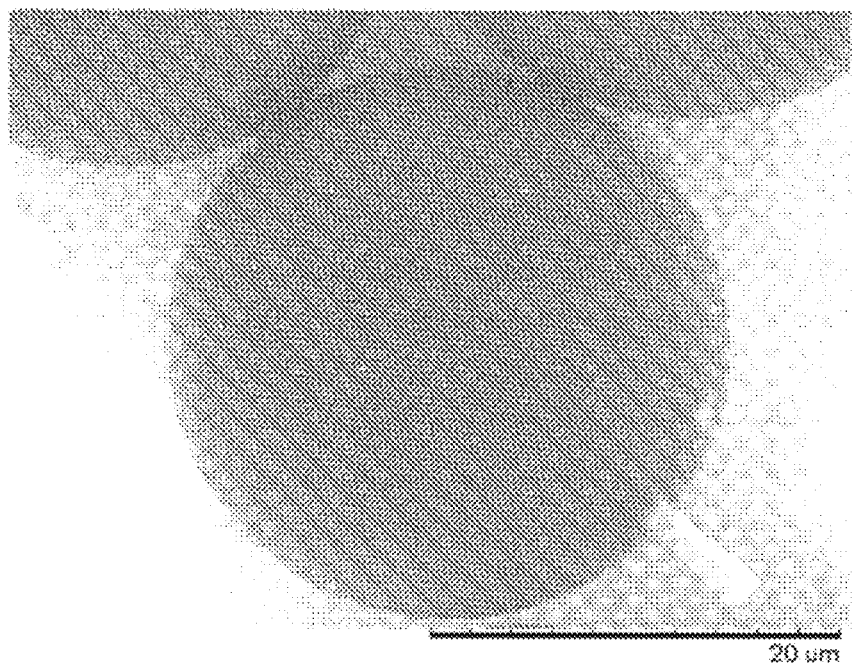
FIG. 10 is a scanning electron microscopy (SEM) image of a single crystal localized deposit of a platinum salt (the white part on FIG. 10) on a carbon bead by bipolar electrochemistry in accordance with the method according to an embodiment of the invention.

It was observed by scanning electron microscopy (SEM) the nanoparticle thus obtained after synthesis by electrodeposition (FIG. 10).

LIST OF REFERENCES

[1] De Gennes, P. G. Soft Matter. Rev. Mod. Phys. 64, 645-648 (1992).

[2] Walther, A., Muller, A. H. E. Janusparticules. Soft Matter 4, 663-668 (2008).

[3] Cole-Hamilton, D. J. Janus catalysts direct nanoparticle reactivity. Science 327, 41-42 (2010).

[4] Hu, S.-H., Gao, X. Nanocomposites with spatially separated functionalities for combined imaging and magnetolytic therapy. J. Am. Chem. Soc. 132, 7234-7237 (2010).

[5] Perro, A., Reculusa, S., Ravaine, S., Bourgeat-Lami, E., Duguet, E. Design and synthesis of Janus micro- and nanoparticles J. Mater. Chem. 15, 3745-3760 (2005).

[6] Roh, K.-H., Martin, D. C., Lahann, J. Biphasic Janus particles with nanoscale anisotropy. Nat. Mater. 4, 759-763 (2005).

[7] Paunov, V. N., Cayre, O. J. Supraparticles and <<Janus>> particles fabricated by replication of particles monolayers at liquid interfaces using a gel trapping technique. Adv. Mater. 16, 788-791 (2004).

[8] Reiche, H., Dunn, W. W., Bard, A. J. Heterogeneous photocatalytic and photosynthetic deposition of copper on $TiO_2$ and $WO_3$ powders. J. Phys. Chem. 83, 2248-2251 (1979).

[9] Duque, J. G., Eukel, J. A., Pasquali, M., Schmidt H. K. Self-assembled nanoparticle-nanotube structures (nano-PaNTs) based on antenna chemistry of single-walled carbon nanotubes. J. Phys. Chem. C, 113, 18863-18869 (2009).

[10] Mokari, T., Sztrum, C. G., Salant, A., Rabani, E., Banin, U. Formation of asymmetric one-sided metal-tipped semiconductor nanocrystal dots and rods. Nat. Mater. 4, 855-563 (2005).

[11] Fleischmann, M., Ghoroghchian, J., Rolison, D., Pons, S. Electrochemical behavior of dispersions of spherical ultramicroelectrodes. J. Phys. Chem. 90, 6392-6400 (1986).

[12] Chow, K.-F., Mavré, F., Crooks, J. A., Chang, B-Y., Crooks, R. M. A large-scale, wireless electrochemical bipolar electrode microarray J. Am. Chem. Soc., 131, 8364-8365 (2009).

[13] Ordeig, O., Godino, N., Del Campo, J., Muños, F. X., Nikolajeff, F., Nyholm, L., On-chip electric field driven electrochemical detection using a poly(dimethylsiloxane) microchannel with gold microband electrodes. Anal. Chem. 80, 3622-3632 (2008).

[14] Ulrich, C., Andersson, O., Nyholm, L., Björefors, F. Potential and current density distributions at electrodes intended for bipolar patterning. Anal. Chem. 81 453-459 (2008).

[15] Bouquet, A., Deschamp, E., Maillet, P., Livache, T., Chatelain, F., Haguet, V. Contactless electrofunctionalization of a single pore. Small 5, 2297-2303 (2009).

[16] Bradley, J.-C.; Crawford, J.; Ernazarova, K.; McGee, M.; Stephens S. G. Wire formation on circuit boards using spatially coupled bipolar electrochemistry. Adv. Mater. 15, 1168-1171 (1997).

[17] Loget, G., Kuhn, A. Propulsion of microobjects by dynamic bipolar self-regeneration. J. Am. Chem. Soc., (2010).

[18] Bradley, J.-C., Chen, H.-M., Crawford, J., Eckert, J., Ernazarova, K., Kurzeja, T., Lin, M., Nadler, W., Stephens, S. G. Creating electrical contacts between metal particles using directed electrochemical growth, Nature, 389, 268-217. (1997).

[19] Bradley, J.-C., Zhongming, M. Contactless electrodeposition of palladium catalysts Angew. Chem. Int. Ed., 38, 1663-1666 (1999).

[20] Warakulwit, C., Nguyen, T., Majimel, J., Delville, M.-H., Lapeyre, V., Garrigue, P., Ravaine, V., Limtrakul, J., Kuhn, A. Dissymmetric carbon nanotubes by bipolar electrochemistry. Nano Lett. 8, 500-504 (2008).

[21] Loget G., Larcade, G., Lapeyre, V., Garrigue, P., Warakulwit, C., Limtrakul, J., Delville, M.-H., Ravaine, V., Kuhn, A., Single point electrodeposition of nickel for the dissymmetric decoration of carbon tubes. Electrochim. Acta 55, 8116-8120 (2010).

The invention claimed is:

1. An electrochemical method of synthesis of Janus particles based on submicron or micron electrically conductive substrates of isotropic shape, said electrochemical method comprising:

a production step comprising applying a potential difference between two electrodes to form Janus particles having a layer of electrochemically depositable material on the submicron or micron electrically conductive substrates of isotropic shape, said layer having a predetermined specific shape delimited by a precise contour selected from the group of the precise contour consisting of: (a) circular line of variable diameter; (b) point; (c) hemisphere; and (d) portion of a hemisphere; and prior to said production step, a preparatory step comprising forming a three-dimensional reaction medium by introducing the submicron or micron electrically conductive substrates of isotropic shape and at least one source of electrochemically depositable material in an electrolytic gelled solution contained in an electrodeposition cell defined by two separators which are impermeable to the submicron or micron electrically conductive substrates of isotropic shape, said electrodeposition cell being positioned between two electrodes, the electrolytic gelled solution having a viscosity adapted to prevent the submicron or micron electrically conductive substrates of isotropic shape from rotating, wherein the production step take place in the entire volume of the three-dimensional reaction medium, wherein the separators are placed in a reactor of electrodeposition containing the three-dimensional reaction medium, the electrolytic gelled solution, and the electrodes, and wherein the separators are positioned between said electrodes to define:

the electrodeposition cell wherein the submicron or micron electrically conductive substrates of isotropic shape and the at least one source of electrochemically depositable material are put in solution, a cathodic compartment, incorporating the electrode serving as cathode and adjacent to one of said separators, and an anodic compartment, incorporating the electrode serving as anode and adjacent to the other separator, and wherein the separators are made of a sintered glass which is non-permeable to the submicron or micron electrically conductive substrates of isotropic shape and permeable to ions.

2. The electrochemical method according to claim 1, wherein the at least one source of electrochemically depositable material is selected from the group consisting of:

(a) metal ions;
(b) semi-conductors formed from metal salts;
(c) electro-polymerizable monomers;
(d) organic electro-crystallizable salts;
(e) inorganic electro-crystallizable salts;
(f) organic electro-graftable molecules;
(g) electrophoretic paints;
(h) precursors of silica-based sol-gel materials;
(i) monomers derived from pyrrole, aniline and thiophene;
(j) precursors of alkoxysilane type which are selected from the group consisting in methyl trimethoxysilane, tetraethoxysilane, methyltriethoxylsilane, dimethyldiethoxysilane, and combinations thereof; and
(k) combinations thereof.

3. The electrochemical method according to claim 2, wherein the at least one source of electrochemically depositable material is a metal ion, the metal ion being selected from the group consisting of ions of gold, copper, zinc, silver, platinum, nickel, and combinations thereof.

* * * * *